United States Patent
Volle et al.

(10) Patent No.: US 7,670,499 B2
(45) Date of Patent: Mar. 2, 2010

(54) COMPOSITION OF POLYETHERDIAMINE, MONOAMINE, DI- OR TRIAMINE, AND ALKYLPHENOL

(75) Inventors: Jörg Volle, Selm-Bork (DE); Michael Vogel, Efringen-Kirchen (DE)

(73) Assignee: Huntsman Advanced Materials Americas LLC, The Woodlands, TX (US)

( * ) Notice: Subject to any disclaimer, the term of this patent is extended or adjusted under 35 U.S.C. 154(b) by 165 days.

(21) Appl. No.: 11/631,900

(22) PCT Filed: Jul. 8, 2005

(86) PCT No.: PCT/EP2005/053269

§ 371 (c)(1), (2), (4) Date: Jul. 12, 2007

(87) PCT Pub. No.: WO2006/005723

PCT Pub. Date: Jan. 19, 2006

(65) Prior Publication Data

US 2007/0292620 A1 Dec. 20, 2007

(30) Foreign Application Priority Data

Jul. 9, 2004 (DE) ........................ 10 2004 033 340

(51) Int. Cl.
*B05D 3/02* (2006.01)
*C08J 5/00* (2006.01)
*C08L 63/00* (2006.01)
*C09K 3/00* (2006.01)

(52) U.S. Cl. ........................ 252/182.18; 252/182.23; 264/331.12; 427/386; 525/502; 525/504; 525/523

(58) Field of Classification Search .................. None
See application file for complete search history.

(56) References Cited

U.S. PATENT DOCUMENTS 3,740,373 A 6/1973 Bentley et al.
4,487,805 A * 12/1984 Sellstrom .................... 428/413
4,487,806 A * 12/1984 Sellstrom et al. ............ 428/413
6,888,257 B2 * 5/2005 Wilson et al. ............... 257/783

FOREIGN PATENT DOCUMENTS

| DE | B 1090803 | 10/1960 |
|---|---|---|
| DE | A 2152606 | 4/1973 |
| DE | A 2200717 | 7/1973 |
| DE | A 2418041 | 11/1975 |
| DE | C 2462791 | 12/1982 |
| EP | A 767189 | 4/1997 |
| GB | 2031431 A * | 4/1980 |
| JP | 57-8221 A * | 1/1982 |
| WO | WO-A 02/44240 | 6/2002 |
| WO | WO 2004/003050 A1 * | 1/2004 |

\* cited by examiner

*Primary Examiner*—Robert Sellers

(57) ABSTRACT

Special amine compositions comprising a) 30-70% by weight of a polyetherdiamine of the general formula (I) in which n is from 10 to 70, b) 3-30% by weight of a monoamine of the general formula $R_1$—$NH_2$, in which $R_1$ is the straight-chain or branched, saturated or preferably unsaturated radical of a hydrocarbon having 5 to 22 carbon atoms or of a monofunctional polyetheramine having a molecular weight of up to 400 g/mol and c) 3-30% by weight of a di- or triamine and d) 5-40% by weight of an alkylphenol of the general formula (II) in which $R_2$ is the straight-chain, branched or cyclic, saturated or unsaturated radical of a hydrocarbon having 5 to 14 carbon atoms, and curable epoxy resin compositions comprising these special amine compositions, the use of which results in thermosets which have a low degree of crosslinking, are resilient even at low temperatures and are resistant to chemical compositions, and the production of shaped articles and coatings using these curable compositions.

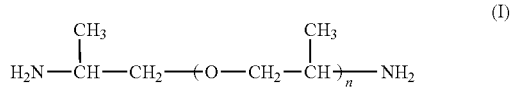

(I)

13 Claims, No Drawings

COMPOSITION OF POLYETHERDIAMINE, MONOAMINE, DI- OR TRIAMINE, AND ALKYLPHENOL

CROSS REFERENCE TO RELATED APPLICATIONS

This application is the National Phase of International Application PCT/EP2005/053269 filed Jul. 8, 2005 which designated the U.S. and which claims priority to German (DE) Pat. App. No. 102004033340.8, filed Jul. 9, 2004. The noted applications are incorporated herein by reference.

The invention relates to special amine compositions and a curable mixture containing these special amine compositions, the use of which results in resilient thermosets which have a low degree of crosslinking and are resistant to chemicals, and to the production of shaped articles and coatings using these curable compositions.

Epoxy resins have long been widely used for the production of anticorrosion paints, abrasion coatings, potting compounds and adhesives, which possess outstanding mechanical strength and have good resistance to chemicals. Owing to their high crosslinking density, amine-cured epoxy resins, especially those based on diphenylpropane and epichlorohydrin, are brittle and hard, having glass transition ranges above 20° C.

In practice, great hardness and high strength of amine-cured epoxy resins are not always necessary and at the same time elastification and reduction of brittleness are frequently desired. Particularly for the production of flexibilized shaped articles or of crack-bridging membranes, high flexibility even at relatively low temperatures is required. Various methods, which are not always satisfactory, have been used to date for this purpose.

In principle, the degree of elastification can be increased internally by reducing the crosslinking density and externally by adding plasticizer.

External elastifying agents are not reactive and are not incorporated into the thermoset network. This method of modification is suitable only for certain applications. They expand the network only by filling space. The external plasticizers include tar, phthalic esters, high-boiling alcohols, glycols, ketone resins, vinyl polymers and similar products which are not reactive with epoxy resins and amine curing agents. The internal elastification of epoxy resins can be achieved by reducing the functionality of the curing agent, as described, for example, in DE-A 2 200 717.

Long-chain, low-functionality aminoamides based on dimeric and trimeric fatty acids have been customary for a long time and used in considerable amounts and achieve a satisfactory property spectrum of soft curing agents for epoxy resins, but, owing to the comparatively high viscosity and low flexibility, cannot be used as universally as would be desirable.

It is also known from DE-A 10 90 803 that such systems can be modified by concomitantly using polyurethanes. This system has been further developed towards elastified plastics by the process described in DE-A 21 52 606.

DE-C 24 18 041 discloses a process for the production of elastified shaped articles and sheet-like structures, in which the polyetheramines described in DE-C 24 62 791 and comprising urethane groups are concomitantly used as curing agents.

These give thermosets having good elastic properties, but in practice a relatively high viscosity of the curable compositions is found to be troublesome. The deaeration of the curable mixtures is poor at high viscosity and use in self-levelling coatings is scarcely possible.

DE 696 31 314 T2=EP 0 767 189 B1 describes amine curing compositions for curing coating compositions of epoxy resins, comprising (A) 5-75% by weight of a diamine which has a vapour pressure of less than 133 Pascal at 20° C. and which contains both primary and tertiary amine, (B) 25-70% by weight of an amidoamine curing agent and (C) 5-50% by weight of a poly(alkylene oxide)-di- or triamine which has at least three active hydrogen atoms. Cured coatings are, however, comparatively brittle and are therefore not suitable for many applications.

WO 02/44240 A1 describes polyetheramine adducts containing hydroxyl groups. These polyetheramine adducts are obtained by the reaction of a polyglycidyl ether, prepared from polyalkylene glycol and epichlorohydrin, with an amine which has at least two reactive amine hydrogens per molecule to give a polyetheramine, and subsequent formation of an adduct of this polyetheramine with an epoxide compound which has at least one epoxide group per molecule. These products have high flexibility. The viscosities of the products thus prepared are, however, likewise comparatively high.

It is therefore an object of the present invention to provide curing agents and curable compositions which, in addition to high flexibility in combination with sufficient strength, should have a low viscosity so that, as a result of their properties, they can also be used for self-levelling coatings.

It has now been found that this object can be achieved by novel special amine compositions.

The present invention therefore relates to a composition comprising a) 30-70, preferably 40-60, % by weight of a polyetherdiamine of the general formula (I)

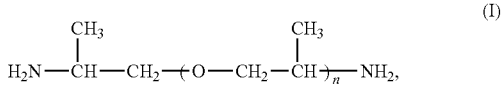

in which n is from 10 to 70, preferably 15-40, b) 3-30, preferably 5-20, % by weight of a monoamine of the general formula $R_1$—$NH_2$, in which $R_1$ is the straight-chain or branched, saturated or preferably unsaturated radical of a hydrocarbon having 5 to 22 carbon atoms or of a monofunctional polyetheramine having a molecular weight of up to 400 g/mol and c) 3-30, preferably 5-20, % by weight of a di- or triamine and d) 5-40, preferably 10-30, % by weight of an alkylphenol of the general formula (II)

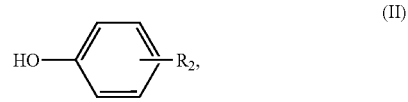

in which $R_2$ is the straight-chain, branched or cyclic, saturated or unsaturated radical of a hydrocarbon having 5 to 14 carbon atoms.

The polyetherdiamines a) are available under the tradename Jeffamine® from Huntsman. Polyetheramines having an average molecular weight of from 1000 to 2400 or corresponding to about n=16-40 according to the general formula (I) are preferably used. It is also possible to use blends of polyetheramines having different molecular weights. Polyetheramines having an average molecular weight of from 1500 to 2200 are particularly preferably used, in particular those having an average molecular weight of 2000, corresponding to approximately n=33.

Unsaturated monoalkylamines having a carbon chain comprising from 8 to 18 carbon atoms are preferably used as monoamine b). Coconut fatty amine (predominantly $C_{12}$-$C_{14}$) is preferably used.

In principle, all amines which have at least two reactive amine hydrogen atoms can be used as diamines c), for example heterocyclic amines, such as piperazine, N-aminoethyl-piperazine; cycloaliphatic amines, such as isophoronediamine, 1,2-(1,3; 1,4)-diaminocyclohexane, tricyclododecanediamine (TCD); araliphatic amines, such as xylylenediamine; aliphatic optionally substituted amines, such as ethylenediamine, propylenediamine, hexamethylenediamine, 2,2,4- or 2,4,4-trimethylhexamethylenediamine, 2-methylpentamethylenediamine, ether amines, such as 1,7-diamino-4-oxaheptane, 1,10-diamino-4,7-dioxadecane, 1,14-diamino-4,7,10-trioxatetradecane, 1,20-diamino-4,17-dioxaeicosane and 1,12-diamino-4,9-dioxydodecane. Furthermore, polyalkylenepolyamines, such as diethylenetriamine, triethylenetetramine, dipropylenetriamine, tripropylenetetramine and higher molecular weight amines or adducts or condensates comprising free aminehydrogen may furthermore be used.

Aminoethylpiperazine, xylylenediamine, isophoronediamine and trimethylhexamethylenediamine are preferably used.

Nonylphenol and/or styrenated phenol, particularly preferably styrenated phenol, are used as alkylphenols d).

The amine compositions thus obtained are comparatively low-viscosity liquids. The amine compositions according to the invention may be used as formulation components for curable compositions—alone or as a mixture with other amine curing agents customary in this area—for epoxy resins for the production of resilient shaped articles, coatings and foams. Surprisingly, it was found that the cured thermosets still have an outstanding elongation at more than 80% even at extreme temperatures of −10° C., the strength values simultaneously also being very high.

The present invention furthermore relates to a curable composition comprising, in addition to the amine compositions according to the invention, an epoxy compound having on average more than one epoxide group in the molecule.

Both the amine compositions according to the invention themselves and the curable compositions have a substantially lower viscosity than the known polyurethanamines and polyetheramine adducts and the curable compositions prepared therefrom. The thermosets obtained using the curable compositions according to the invention are distinguished by outstanding low-temperature flexibility after curing is complete.

For the formulation of a reaction resin material for coatings, adhesive bonding or potting, the customary additives, such as mineral and organic fillers, pigments, plasticizers, accelerators, solvents and other additives, are suitable. For the preparation of foams, the blocking agents customary in this area, in particular the hydrogen-eliminating silane compounds, may be used.

The amine compositions according to the invention can be formulated in a known manner with other formulation components, such as viscosity regulators, accelerators—such as tertiary amines, triphenyl phosphite or alkylphenols—or with fast curing agents, such as Mannich bases.

The concomitantly used epoxide compounds are curable in the hot and cold state with the curing agents or curing agent mixture according to the invention. They contain on average more than one epoxide group in the molecule and may be glycidyl ethers of monohydric or polyhydric alcohols, such as, for example, glycerol, hydrogenated diphenylolpropane, or of polyhydric phenols, such as, for example, resorcinol, diphenylolpropane or phenol/aldehyde condensates. It is also possible to use the glycidyl esters of polybasic carboxylic acids, such as hexahydrophthalic acid or dimerized fatty acids.

The use of liquid epoxy resins based on epichlorohydrin and diphenylolpropane and/or diphenylmethane, having epoxide values of 0.4-0.7 equivalent of epoxide/100 g of resin, is preferred.

Resins which are diluted with reactive diluents and contain, as reactive diluents, for example, monofunctional aliphatic and aromatic glycidyl ethers, such as, for example, butylglycidyl ether or phenylglycidyl ether, or glycidyl esters, such as glycidyl acrylate, or epoxides, such as styrene oxide, or polyfunctional, in particular low molecular weight, di- or triglycidyl ethers are particularly preferred.

The combination of long-chain, weakly crosslinking polyetheramines with highly crosslinking amine formulations makes it possible, in a wide range, to adjust the properties of the reaction resin materials with respect to viscosity, reactivity, etc. and the properties of the thermoset with respect to resilience, crosslinking density, mechanical strength and resistance to chemicals.

The compositions according to the invention can be particularly advantageously used where good adhesion to the substrate, good resistance to chemicals and resilience are required for bridging cracks in the substrate and for eliminating internal stress, even at relatively low temperatures.

An important field of use is therefore, for example, the crack-bridging coating of concrete, for example for industrial floors or impermeable safety troughs, for example for heating oil tanks. Owing to their outstanding adhesion to iron and concrete and the adjustable resilience, the compositions according to the invention are furthermore suitable as sealing compounds for joints, adhesives and liquid-tight, crack-bridging membranes. The low-shrinkage and low-stress curing also permits the production of large mouldings or shaped articles.

The present invention therefore furthermore relates to a process for the production of shaped articles, coatings and foams, characterized in that a curable composition according to the invention is used for the production of the shaped articles.

Starting from the abovementioned binder formulations, it is also possible to produce filled, resilient floor coverings, potting compounds and elastified adhesives and resilient epoxy resin/curing agent foams.

EXAMPLES

Example 1

According to the Invention

Example of a liquid-tight, crack-bridging membrane.
a) 51.75 g of the polyoxypropylenediamine Jeffamine D 2000,
b) 9.14 g of coconut fatty amine,
c) 9.14 g of trimethylhexamethylenediamine (isomer mixture) and d) 26.73 g of nonylphenol and 3.25 g of tris(2,4,4-dimethylaminomethyl)phenol are mixed with one another. Viscosity: 275 mPa·s; theoretical (Th.) amine equivalent: about 250.

Example 2

Comparative Example

Curing agent according to example 14 from WO 02/44240
Viscosity: about 1000 mPa·s; Th. amine equivalent: about 230

Example 3

Comparative Example

Aradur® 76 (polyetherpolyamine from Huntsman for highly flexible binders)
Viscosity: 1500 mPa·s; Th. amine equivalent: about 250

Example 4

Comparative Example a) 51.75 g of the polyoxypropylenediamine Jeffamine D 2000
b) 18.28 g of coconut fatty amine
d) 26.73 g of nonylphenol and 3.25 g of tris(2,4,4-dimethylaminomethyl)phenol are mixed with one another. Viscosity: 248 mPa·s, amine equivalent: 353

Example 5

Comparative Example a) 51.75 g of polyoxypropylenediamine Jeffamine D 2000
c) 18.28 g of trimethylhexamethylenediamine (isomer mixture)
d) 26.73 g of nonylphenol and 3.25 g of tris(2,4,4-dimethylaminomethyl)phenol are mixed with one another. Viscosity: 320 mPa·s, amine equivalent: 178

Example 6

According to the Invention

Composition corresponding to example 1 but with styrenated phenol instead of nonylphenol.
Viscosity: 260 mPa·s, amine equivalent: 250

Example 7

Comparative Example

Curing agent according to example 1a) of DE-A 2 200 717:
a) 50 g of coconut fatty amine,
b) 50 g of trimethylhexamethylenediamine and
c) 147 g of p-nonylphenol mixed with one another.
Viscosity: 300 mPa·s, amine equivalent: 140

Use Examples

In Each Case:
131 g of the amine composition from example 1,
122 g of the curing agent example 14 from WO 02/44240 A1 (example 2),
131 g of the curing agent Aradur 76 (example 3)
185 g of the curing agent from exampje 4,
94 g of the curing agent from example 5,
131 g of the curing agent from example 6 and
73 g of the curing agent from example 7 are thoroughly stirred with 100 g of a mixture of 86% by weight of a dian resin (bisphenol A) having an epoxide value of 0.52 equivalent/100 g of resin and 14% by weight of a long-chain monofunctional reactive diluent based on $C_{12}$-$C_{14}$-fatty alcohol having an epoxide value of 0.33. The mixture is then distributed in the test mould in a thickness of about 3 mm. After about 24 h at room temperature, the membrane is suitable for use and, after duration of curing of 7 days at 23° C., the following physical values are measured at room temperature as well as at −10° C. (cf. table 1):

TABLE 1

| | Ex. 1 | Ex. 2 | Ex. 3 | Ex. 4 | Ex. 5 | Ex. 6 | Ex. 7 |
|---|---|---|---|---|---|---|---|
| Viscosity/25° C.[1] [mPa · s] | 275 | 1000 | 1500 | 248 | 320 | 260 | 300 |
| Curing conditions | 7 d/ 23° C. | 7 d/ 23° C. | 7 d/ 23° C. | 7 d/ 23° C. | 7 d/ 23° C. | 7 d/ 23° C. | 7 d/ 23° C. |
| Tensile strength [MPa] at RT [DIN 54455] | 4.3 | 10 | 4.7 | N.m.*) | 11.6 | 5.7 | 5.8 |
| Elongation (tension) [%] at RT [DIN 53507] | 109 | 34 | 93 | N.m. | 41 | 95 | 69 |
| TP [N/mm] at RT [DIN 53515] | 7.8 | 8.9 | 8.5 | N.m. | 45.9 | 11.3 | 16.1 |
| Tensile strength [MPa] at −10° C. [DIN 54455] | 15.9 | 16.5 | 16.3 | N.m. | 34.8 | 18.4 | 49.8 |
| Elongation (tension) [%] at −10° C. [DIN 53507] | 81 | 35 | 56 | N.m. | 20 | 75 | 9 |
| TP [N/mm] at −10° C. [DIN 53515] | 30.4 | 13.8 | 43.4 | N.m. | 72.2 | 29.5 | 29 |
| 250 g gel time 23° C. [min] | 86 | 53 | 46 | N.M. | 52 | 74 | 20 |

*)Curing agent mixture is still tacky and not completely cured even after 7 days at room temperature
[1]All viscosity data are applicable to 25° C. and were measured using the rotational viscometer Vt 550 from Haake
[2]TP = Graves tear propagation resistance Discussion of the Results:

As is evident from table 1, the curing agents according to the invention from examples 1 and 6 have a comparative low viscosity of 275 mPa·s and 260 mPa·s respectively. Moreover, the cured thermosets from examples 1 and 6 have, at room temperature (7d), elongation values in combination with comparatively high tensile strength and tear propagation resistance. At −10° C., the examples according to the invention surprisingly still have very high elongation values, whereas the elongation values of the comparative examples have decreased substantially in some cases. Particularly in comparative example 7 (example 1 from DE-A 2 200 717), the elongation values at −10° C. decrease particularly sharply. Such a decrease in the elongation values would have been expected even with the curing agents according to the invention, or lower strength values would have been expected in combination with high elongation values. This result was surprising and not foreseeable. The composition according to the invention comprising the polyetherdiamines, monoamines, diamines and alkylphenols described, is, as is evident from the results, very advantageous, as also shown by the further comparative examples. In example 4, the curing agent was formulated without a proportion of a diamine or triamine. The product still has not completely cured even after 7 days at room temperature and therefore can scarcely be used industrially. In example 5, once again, a curing agent was formulated with a diamine but without addition of a monoamine. The elongation of the cured thermoset, in particular at −10° C., is comparatively low.

The invention claimed is:

1. Composition consisting of
   a) 30-70% by weight of a polyetherdiamine of the general formula (I)

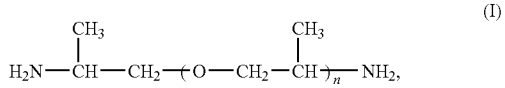

in which n is from 10 to 70,
   b) 3-30% by weight of a monoamine of the general formula $R_1$—$NH_2$, in which $R_1$ is the straight-chain or branched, saturated or unsaturated radical of a hydrocarbon having 5 to 22 carbon atoms or of a monofunctional polyetheramine having a molecular weight of up to 400 g/mol,
   c) 3-30% by weight of a diamine selected from the group consisting of xylenediamine, isophoronediamine and trimethylhexamethylenediamine, and
   d) 5-40% by weight of an alkyphenol of the general formula (II)

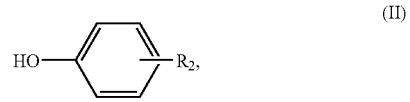

in which $R_2$ is a straight-chain, branched or cyclic, saturated or unsaturated radical of a hydrocarbon having 5 to 14 carbon atoms.

2. Composition according to claim 1, consisting of
   a) 40-60% by weight of the polyetherdiamine of the general formula (I),
   b) 5-20% by weight of the monoamine of the general formula $R_1$—$NR_2$,
   c) 5-20% by weight of the di- or triamine and
   d) 10-30% by weight of the alkylphenol of the general formula (II).

3. Composition according to claim 1, characterized in that the polyetherdiamine of a) is a polyoxypropylenediamine with n=16 to 40.

4. Composition according to claim 1, characterized in that the monoamine b) is a fatty amine having 8 to 18 carbon atoms.

5. Composition according to claim 4, characterized in that the monoamine b) is an unsaturated fatty amine.

6. Composition according to claim 1, characterized in that the alkylphenol is nonylphenol and/or styrenated phenol.

7. Composition according to claim 6, characterized in that the alkylphenol is styrenated phenol.

8. Curable composition comprising an epoxide compound having on average more than one epoxide group in the molecule, a composition according to claim 1 as a curing agent and optionally one or more additives.

9. Curable composition according to claim 8, characterized in that the epoxide compound is a glycidyl ether of a monohydric or polyhydric alcohol, a glycidyl ether of a polyhydric phenol or a glycidyl ester of a polybasic carboxylic acid.

10. Curable composition according to claim 9, characterized in that the epoxide compound is an epoxy resin mixture comprising a bisphenol A resin and/or a bisphenol F resin with a glycidylated $C_{12}$-$C_{14}$-alcohol.

11. A method of bridging cracks in a substrate comprising the steps of applying the curable composition of claim 8 to the substrate and curing the composition.

12. The method of claim 11 wherein the substrate is concrete or iron.

13. A method of producing a shaped article from a mould comprising the steps of distributing the curable composition of claim 8 in the mould, curing the curable composition and removing the shaped article from the mould.

* * * * *